(12) United States Patent
Hartmann et al.

(10) Patent No.: US 9,969,554 B2
(45) Date of Patent: May 15, 2018

(54) CHUTE FOR ARTICLES AND METHOD FOR USING SUCH A CHUTE

(71) Applicants: Bernd Hartmann, Grafschaft-Leimersdorf (DE); Wolfram Grafe, Elmenhorst (DE)

(72) Inventors: Bernd Hartmann, Grafschaft-Leimersdorf (DE); Wolfram Grafe, Elmenhorst (DE)

(73) Assignee: Deutsche Post AG, Bonn (DE)

( * ) Notice: Subject to any disclaimer, the term of this patent is extended or adjusted under 35 U.S.C. 154(b) by 0 days. days.

(21) Appl. No.: 15/595,206

(22) Filed: May 15, 2017

(65) Prior Publication Data

US 2017/0334648 A1 Nov. 23, 2017

(30) Foreign Application Priority Data

May 20, 2016 (DE) .................. 10 2016 109 313

(51) Int. Cl.
| | |
|---|---|
| *B65G 11/00* | (2006.01) |
| *B65G 11/20* | (2006.01) |
| *B65G 11/02* | (2006.01) |
| *B65G 19/28* | (2006.01) |
| *B65G 47/44* | (2006.01) |

(52) U.S. Cl.
CPC ............ *B65G 11/203* (2013.01); *B65G 11/02* (2013.01); *B65G 11/00* (2013.01); *B65G 11/20* (2013.01); *B65G 11/206* (2013.01); *B65G 19/28* (2013.01); *B65G 47/44* (2013.01)

(58) Field of Classification Search
CPC ..... B65G 11/203; B65G 11/206; B65G 11/02; B65G 11/00; B65G 11/20

USPC ........ 193/2 R, 25 R, 25 A, 25 E, 25 S, 25 B, 193/25 C, 32

See application file for complete search history.

(56) References Cited

U.S. PATENT DOCUMENTS

| | | | | |
|---|---|---|---|---|
| 2,821,278 A | * | 1/1958 | Paschal | ................... A01F 25/00 |
| | | | | 193/2 R |
| 3,187,872 A | * | 6/1965 | Hill | ...................... A01D 45/006 |
| | | | | 193/16 |

(Continued)

FOREIGN PATENT DOCUMENTS

| | | |
|---|---|---|
| DE | 907 516 B | 3/1954 |
| DE | 40 17 128 A1 | 12/1991 |

(Continued)

*Primary Examiner* — William R Harp
(74) *Attorney, Agent, or Firm* — Reinhart Boerner Van Deuren P.C.

(57) ABSTRACT

Provided are embodiments of a chute for articles, in particular packages and/or consignments, having a chute base for the article to slide down and comprising at least two chute-base sections is described, wherein the at least two chute-base sections form a height offset between one another, wherein at least one guiding device is provided between the at least two chute-base sections in order to guide the article from one chute-base section to the next chute-base section, wherein the at least one guiding device has a vertically adjustable free end that points in the direction of the next chute-base section, and wherein the guiding device has, transversely to the chute base, a plurality of finger elements that are arranged alongside one another and are at least in part vertically adjustable independently of one another.

28 Claims, 9 Drawing Sheets

(56) References Cited

U.S. PATENT DOCUMENTS

Figure 1:
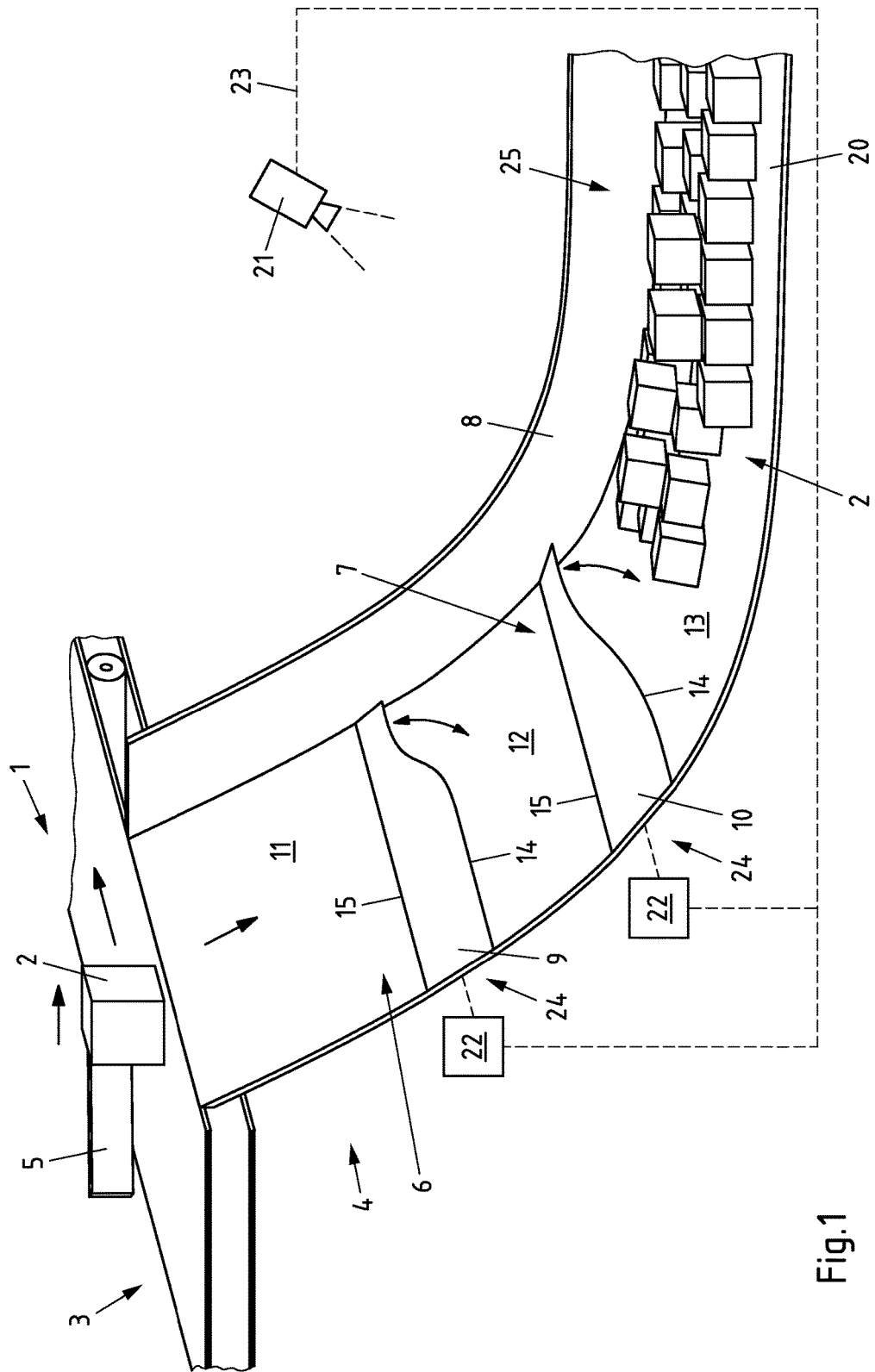

| | | | | |
|---|---|---|---|---|
| 3,738,507 A | * | 6/1973 | Livingston | B65D 88/64 |
| | | | | 105/239 |
| 3,841,461 A | | 10/1974 | Henderson et al. | |
| 6,095,314 A | | 8/2000 | Fortenbery | |
| 8,607,964 B2 | * | 12/2013 | Kheifets | B65G 43/08 |
| | | | | 193/21 |
| 8,757,347 B2 | * | 6/2014 | Heitplatz | B65G 11/203 |
| | | | | 193/25 A |
| 9,278,809 B2 | * | 3/2016 | Lykkegaard | B65G 11/081 |
| 2017/0096301 A1 | * | 4/2017 | Hartmann | B65G 21/10 |

FOREIGN PATENT DOCUMENTS

| | | |
|---|---|---|
| DE | 40 41 268 A1 | 6/1992 |
| DE | 44 15 788 A1 | 11/1995 |
| JP | 2001-315928 A | 11/2001 |
| WO | WO 2013/091652 A1 | 6/2013 |

* cited by examiner

CHUTE FOR ARTICLES AND METHOD FOR USING SUCH A CHUTE

CROSS-REFERENCE TO RELATED PATENT APPLICATION

This patent application claims priority to German Application No. 10 2016 109 313.0, filed May 20, 2016, the entire teachings and disclosure of which are incorporated herein by reference thereto.

FIELD OF THE INVENTION

The invention relates to a chute for articles, having a chute base for the article to slide down and comprising at least two chute-base sections, wherein the at least two chute-base sections form a height offset between one another, wherein at least one guiding device is provided between the at least two chute-base sections in order to guide the article from one chute-base section to the next chute-base section, and wherein the at least one guiding device has a vertically adjustable free end that points in the direction of the next chute-base section. Furthermore, the invention relates to a method for conveying articles along a chute of the above-mentioned type.

BACKGROUND OF THE INVENTION

Chutes for articles of the abovementioned type are used in particular for sorting packages and are configured as what are known as box chutes. In this case, the articles are sorted in a sorting installation, known as a sorter, into a plurality of chutes according to defined criteria. In the chutes, the articles slide downwards along the chute base to the end of the chute, where the articles are temporarily stored in a collecting region until the articles are removed from the chute.

In this case, the sorter generally has a transporting device arranged at a raised height, for instance in the form of a belt conveyor or roller conveyor, along which the articles are transported until they are diverted from the transporting device into a chute that is usually configured as a box chute. Via the chute, the height difference with respect to the sorter is overcome and the articles are transported to the side, where they can be removed without problems. In addition, a larger area for temporarily storing the articles can be provided via the chute than if the articles were temporarily stored directly on the transporting device.

The articles deflected into the chutes often follow an identical or in any case very similar path along the chute base, said path generally representing a curved path (trajectory). The stored articles therefore line up one after another along the corresponding path. In order to make better use of the space provided by the chute and for it to be possible to receive more articles in a chute, the chutes are often formed in a cascade. This means that at least two chute-base sections are provided with a height difference between the two facing ends of the chute-base sections, said height difference representing a jump for the articles. Thus, the chute-base sections do not transition into one another and are not arranged in a manner aligned with one another, either. The jump ensures that the articles are stacked randomly on top of one another, as required, and/or undergo a random change in direction, as required. As a result of the articles being stacked, more articles can be temporarily stored in a smaller space. The change in direction ensures that more articles come to rest alongside one another in the collecting region of the chute, this contributing to an additional space saving. At the same time, however, on account of the jumping of the articles in the case of cascaded chute bases, damage to the articles repeatedly occurs, in particular when the articles are packages.

In order to reduce the damage to the articles, in some chutes, guiding devices are provided between individual chute-base sections, which extend over the width of the chute base and can be pivoted up and down about a horizontal axis. A sufficient transporting speed of the articles is ensured in that the guiding device is configured as a belt conveyor that is driven in the longitudinal direction of the chute base. When the packages are intended to be stacked, the guiding device is pivoted upwards with the free end pointing in the conveying direction, in order to lift the articles to a higher plane, such that the articles come to rest on already stored articles. In this way, a cascade can ultimately be reproduced and damage to the articles can be avoided.

The above-described chute and the likewise above-described method are suitable in particular for sorting articles of different types. The articles can be for example products or goods. In particular, they are packages, these being articles, such as goods, consignments or other items, that are packaged with packing materials. The articles can also be bulk material in this case.

Consignments are typically delivered to particular addresses. In addition, the consignments are often packages, that is to say packaged articles. Before the consignments are delivered to the addressees of the consignments, pre-sorting frequently takes place in a distribution centre, for instance in accordance with the geographical area of the addressees. The distribution centre can be for example what is known as a parcel sorting centre, a warehouse or the like. After being sorted, the consignments can be delivered or sorted further, which can take place for example at a different location from the previous sorting operation. The consignments can be delivered to the addressees of the consignments or to corresponding drop-off points, for example parcel boxes or Packstations.

In the present case, articles, packages and/or consignments are considered to be a variety of different items which can preferably be transported with reasonable effort as regards their size and their weight. These include items for everyday use, such as consumables or foodstuffs, and also technical items and equipment. In many cases, the consignments are letters, parcels and/or flyers. In this case, parcels also include packets, while flyers can also be leaflets, brochures and periodicals.

Irrespective of the type of articles, there is generally increasing interest in ever more effective and more efficient devices and methods for sorting articles, and this can no longer be accommodated in a satisfactory manner with the existing solutions.

BRIEF SUMMARY OF SOME EXEMPLARY EMBODIMENTS OF THE INVENTION

The present invention is based on the object of configuring and developing the chute and the method, in each case of the type mentioned at the beginning and explained in more detail above, such that the effectiveness of sorting can be increased overall.

This object is achieved in the case of a chute according to embodiments as described in the claims in that the guiding device has, transversely to the chute base, a plurality of finger elements that are arranged alongside one another and are at least in part vertically adjustable independently of one another.

The object is also achieved according to embodiments of the claims by a method for conveying articles along a chute,
  in which the articles are temporarily stored at the lower end of the chute,
  in which the height of the free ends of at least individual finger elements is adjusted while the articles are being temporarily stored, in order to make better use of the width of the chute for storing the articles, in order to stack on top of one another the articles to be stored, and/or in order to reduce the dropping height of the articles from one chute-base section to the next chute-base section.

The invention has recognized that the articles can be guided in a very much more targeted manner along the chute base when the guiding device is provided with a plurality of finger elements that are arranged alongside one another transversely to the chute base and are configured in a vertically adjustable manner with respect to one another. The free ends of adjacent finger elements, which form the free end of the guiding device or can be assigned thereto, can thus be arranged at different heights. Thus, the guiding device can be formed in a targeted manner by the fingers being adjusted with respect to one another and with respect to the chute base such that the articles are guided in the desired manner from one chute-base section to the following chute-base section. This can mean for example that the articles to be stored are moved transversely to the chute base to different extents. Then, better use can be made of the width of the chute or the width of the collecting region at the end of the chute, in order to store more articles there. For example, a movement component transversely to the chute base can be imparted to the articles when the articles move over a surface inclined transversely to the chute base, it being possible for this to be achieved in turn by finger elements raised to different extents in this region of the guiding device. If all the finger elements are raised to the same extent, such that the guiding device is raised uniformly overall, the guiding device is not inclined transversely to the chute base but about a horizontal axis.

However, the finger elements can also be adjusted such that the articles pass onto other packages and come to rest there. Thus, articles can be stored in various layers one on top of another or as a randomly arranged pile, this being very space-saving. In addition, the finger elements can be adjusted just as far as is necessary for articles to be stacked on already present articles. This can mean for example that articles are raised further by the finger elements, the higher the articles on which the arriving articles are intended to be stacked are. This ultimately allows space-saving stacking of the articles with at most very minor damage to the articles.

The guiding device can also be used to reduce the dropping height of the packages from one chute-base section to the next chute-base section. This can be the case when the chute-base sections are arranged in a cascade. If, for example, no article is provided at the bottom end of one step of the cascade, the guiding device can be moved into a position which allows a smooth transition of the article from one chute-base section to the next chute-base section. Since the finger elements are vertically adjustable independently of one another, the fingers in a different position can simultaneously be arranged at a different height, for instance in order to guide a further article there onto an article already positioned in front of the step of the cascade.

The plurality of fingers that are vertically adjustable independently of one another provide considerable flexibility with which the guiding device can act on the movement of the articles to be stored, in order to configure sorting in a more effective manner overall. In addition, the finger elements can be raised to different extents in different sections of the guiding device in order to guide the articles in different directions in the different sections. In this case, the finger elements do not have to be adjustable completely independently of one another. At most, the finger elements are not positively coupled in terms of their vertical adjustability in the sense that one finger element always has to be in the same relative position to another, in particular to an adjacent finger element, or in the sense that the position of a finger is exactly predetermined by the position of another finger, in particular of an adjacent finger. At the same time, however, it is also possible for the finger elements to be able to be vertically adjustable in a manner coordinated with one another. Thus, for example, a sliding profile rather than a more chaotic profile of the finger elements transversely to the guiding device can be achieved, this being preferred in principle, specifically all the more, the more finger elements are provided.

In many cases, the thinner the finger elements are formed, the more expedient it will be. This goes in particular for small articles. For example, finger elements of human finger size can be preferred. In addition, the finger elements are arranged or distributed over the entire width of the chute, wherein the width and/or the length of the respective chute can be adapted to the size of the articles to be sorted or to other parameters.

In the following text, for better understanding and in order to avoid unnecessary repetitions, the chute and the method, in each case of the type mentioned at the beginning and described in more detail above, are described together, without always specifically distinguishing linguistically between the chute and the method. It is clear to a person skilled in the art from the context, however, which features are in each case preferred for the chute and for the method.

In a first particularly preferred configuration of the chute, the free ends of the finger elements are arranged at different heights. Thus, it is possible to react to different conditions at different points of the guiding device, such that the articles can be passed on as favourably as possible to the next chute-base section at different points of the guiding device and/or in order to provide a surface inclined transversely with respect to the chute base, in order to be able to impart a movement component transversely to the chute base to an article via this surface. In this case, for suitable and/or smooth guidance of articles by the guiding device, it may be quite fundamentally preferred for the guiding device to be arranged in an undulating manner transversely to the chute base as a result of the free ends of the finger elements being positioned at different heights. Alternatively or additionally, the free ends of the finger elements can be arranged, transversely to the chute base, partially in a lower position, partially in an upper position and/or partially in a position between the lower position and the upper position. The latter applies in particular, but not exclusively, for the case in which a section with finger elements in the upper position adjoins one side of the corresponding section and a section with finger elements in the lower position adjoins the opposite side thereof. Thus, for example, an undulating shape can be provided. In principle, however, it is also possible for each section to be oriented differently, in order to take account of the local conditions with regard to suitable guidance of the articles.

In order for it to be possible to provide a high level of flexibility in the adjustment of the guiding device as a whole and also to be able to make minor modifications with regard to the guidance of the articles by the guiding device, it is appropriate, if necessary, for the free ends of the finger elements, in particular each, to be at least substantially continuously adjustable between a lower position and an upper position.

In order, if necessary, to not or not appreciably influence the sliding of articles down along the guiding device, it may be expedient for the free ends of at least particular finger elements, if these are in a lower position, to be arranged at least approximately at the height of the next chute-base section. The height of the next chute-base section is understood here to be in particular the height of the start of the next chute-base section and/or the height of the next chute-base section in the region of the free ends of the correspondingly arranged finger elements. In the abovementioned manner, a smooth transition of the inclination of the chute base from one chute-base section to the next chute-base section can be provided, for instance. Alternatively or additionally, upper positions of the free ends of at least particular finger elements can be provided, which are arranged at least at a particular spacing above the next chute-base section. The particular spacing can in this case be dependent on the configuration of the chute and/or on the size of the articles. Here too, the height of the next chute-base section is understood to be in particular the height of the start of the next chute-base section and/or the height of the next chute-base section in the region of a vertical acting on the free ends of the corresponding finger elements. In a corresponding manner, stacking of the articles sliding successively down the chute can be achieved, specifically in particular when articles are stacked on other articles. The height of the articles should then not exceed a particular value, in order to allow the articles to be stacked in a given chute. The height that should not be exceeded depends in turn on the particular configuration of the chute.

It is particularly preferred with regard to the adjustability of the finger elements for the finger elements to have in each case at least two flexible flank elements that extend jointly in the longitudinal direction of the finger element as far as the free end of the finger element, wherein the flexible flank elements are each connected flexibly together, preferably in the longitudinal direction of the finger elements, via a plurality of crosspieces. In this way, the free ends of the finger elements can be adjusted easily from a lower position into an upper position and back again. In addition, the finger elements can make use of what is referred to as the fin ray effect, which is observed in the tailfins of bony fish. If a finger is pressed laterally against them, as a result of the fin ray effect, the fins do not curve away, but rather they bend towards the finger. This is possible on account of the special construction of the fins, which is imitated by the finger elements in the above-described configuration.

To this end, the finger elements have at least two flexible flank elements that extend jointly from one end of the finger element to an opposite end of the finger element. The flexibility of the flank elements can be provided for example by resilient flank elements or by a link chain made up of rigid chain links that are connected together in a pivotable or articulated manner. In this case, corresponding flexibility is required only in one spatial direction. Flexibility is not absolutely necessary in the spatial directions perpendicular thereto. Therefore, the flank elements can also be formed without problems for example in a strip-shaped manner, wherein greater flexural rigidity can arise in the plane of the strip. Alternatively, however, a bar-shaped configuration of the flank elements is also possible. The corresponding flexibility of the flank elements ultimately allows the finger elements to curve from a stretched position into a curved position for example similar to the curvature of a finger, in particular upwards or downwards.

In order that the curving of the finger elements in one direction can be triggered for example by pressure on the finger elements, in particular on a flank element, in the opposite direction, the at least two flank elements are each connected flexibly together between the two ends of the finger elements via a plurality of crosspieces. In this case, the crosspieces can be formed in a rigid manner and be connected to the flank elements in a pivotable or articulated manner. However, if necessary as an alternative to pivotable or articulated connections to the at least two flank elements, use can also be made of flexible, in particular resilient crosspieces. In this way, the crosspieces can be pivoted with respect to the at least two flank elements in order thus to allow the finger element to curve.

The structure of the finger elements optionally allows them to curve, if for instance an article presses against a finger element. On account of their structure, the finger elements can, however, be curved in particular in a deliberate manner, resulting in the free end of the finger elements being raised or lowered without requiring contact for instance with an article. The curving or adjustment of the finger elements, wherein the focus is on the raising and lowering of the free ends of the finger elements in particular, takes place for example in that the flank elements are adjusted with respect to one another in the longitudinal direction of the corresponding finger elements. The shape of the finger elements then arises inevitably, specifically in particular in dependence on the connection of the flank elements together via the crosspieces in between. In a simple configuration, the flank elements can be oriented in a mirror-symmetrical manner in one position of a finger element and/or the crosspieces can be oriented parallel to one another.

In order for it to be possible to adjust the finger elements for example not just in one plane, the finger elements can also have for example three or more flank elements, which are connected together via crosspieces. However, adjustability of the finger elements in one direction, specifically in particular the vertical direction, will generally be sufficient.

In order for it to be possible to ensure suitable movability and thus adjustability of the finger elements, it is appropriate for the crosspieces and the associated flexible flank elements to form an acute angle of preferably between 10° and 80° to one side, and an obtuse angle of preferably between 100° and 170° to the other side. By contrast, right angles can impede or restrict the adjustability of the finger elements.

In order for it to be possible to adjust the finger elements and thus to raise the free ends of the finger elements and lower them again in the desired manner, the flexible flank elements of the finger elements can each be adjustable with respect to one another in the longitudinal direction of the finger elements. In order for it to be possible to adjust the finger elements as independently of one another as possible, it is appropriate for the flank elements of different finger elements to be able to be adjusted differently. The flank elements are adjusted preferably by way of a corresponding drive device, which can be actuated in the desired manner in order to ensure the desired position of the finger elements. If necessary, the separate adjustment of the finger elements can be achieved easily in that the different finger elements are assigned at least partially separate drive devices.

In order that the number of finger elements for a guiding device remains manageable and that the finger elements do not have to be formed in a particularly wide manner, it is appropriate for the finger elements to be covered with a flexible material web which can then also cover the intermediate spaces between the finger elements. Small or sharp articles can thus not pass accidentally into the intermediate spaces between the finger elements. The material web can in principle be made of different materials. The articles can slide without problems on smooth materials and, if necessary, be braked on rough materials. The sliding friction can be set, as required, through the choice of corresponding material pairs. In addition, the flexibility of the material web cannot just be ensured by the material used and the thickness thereof. It is also possible to provide flexible connections between sections of the material web, which can be configured for example as hinges. If finger elements, or the free ends thereof, are arranged, transversely to the chute base, at different heights alongside one another, it is possible for the material web to at least substantially follow this height difference.

Alternatively or additionally, a circulating, if necessary driven, material web can be provided around in each case at least one finger element. The material web can then be configured in a similar manner to a belt of a belt conveyor and, if necessary, likewise be held along the at least one associated finger element. If the material web is driven, specifically in the longitudinal direction of the finger elements, for instance such that the material web is moved on the finger elements in the direction of the free ends, the articles can be accelerated or slowed down on passing over the material web. Of course, in this case, the static friction and the sliding friction of the respective material pairs of article and material web also plays a part. In the case of a circulating material web, the latter can be supported only by one finger element or by a plurality of finger elements, wherein the material web can then, as already described above, close off the intermediate spaces between the finger elements. In other words, individual finger elements or a plurality of finger elements can be configured as a belt conveyor or the load-bearing structure of a belt conveyor.

In order to adjust the finger elements in the manner that is particularly expedient for the particular operating situation, at least one, preferably optical, sensor for capturing the respective operating situation can be provided. The operating situation is characterized in this case for instance by the number and/or type of individual stored articles, the position of individual stored articles, the dimensions of individual stored articles, the arrangement of a pile of stored articles and/or the shape of a pile of stored articles. This or these parameter(s) are therefore preferably captured and can be used to actuate or adjust the finger elements of a guiding device. If, for example, the number of stored articles is captured, it is possible to conclude therefrom how the already stored articles are arranged at the end of the chute. This information can be used in order to guide the subsequent articles in a particular direction by adjusting the guiding device, for instance in order to make better use of the space available for storing the articles or to avoid damage when the articles are conveyed. If, in addition, the type, that is to say for example the shape or size, of the articles is captured, it is then generally possible to draw even better conclusions as to the arrangement of the articles stored at the end of the chute. It goes without saying that, for example, it is also possible to take into consideration if all or only some articles are removed from the chute. The removal of articles from the chute can likewise be captured via an, in particular optical, sensor. The corresponding information can also be provided in some other way, in particular for processing thereof. If necessary, it can also be sufficient to capture only the type of articles. In addition, it is then possible to use in particular the time that has passed or information, provided in some other way, relating to the number of articles, in order to draw conclusions as to the arrangement of the stored articles in the chute. If necessary, it is also possible to capture the position of individual stored articles and/or the dimensions of individual stored articles in a targeted manner by the sensor. In this case, in particular the articles that are arranged upstream of the corresponding guiding device are then of particular interest. In principle, however, the sensor can also capture a pile of articles, specifically in particular the arrangement of a pile of stored articles and/or the shape of a pile of stored articles. Then too, it is expediently possible to decide where further articles should be guided to, in order then to set the finger elements of the guiding device.

In order that the height of the free ends of the finger elements can be set in a targeted manner and in accordance with predetermined criteria, in particular also in a reproducible manner, it is appropriate to use a setting device. The setting device can set or adjust the finger elements in a time-dependent manner, in a manner dependent on the number and/or type of individual stored packages and/or in a manner dependent on at least one parameter captured by the sensor. To this end, it is preferred, for the sake of simplicity, for the setting device to adjust the finger elements on the basis of at least one signal that is transmitted to the setting device by the sensor for capturing the corresponding parameters.

In order to be able to achieve guidance of the articles that is as flexible or precise as possible by means of the guiding device, a plurality of finger elements can be carried by a hand element which is preferably for its part configured in a vertically adjustable manner. In this case, the finger elements provided in a guiding device can be assigned to different hand elements. If the at least one hand element is adjustable with respect to the chute base, the finger elements held on the hand element can be adjusted jointly via the hand element, in particular raised, lowered or pivoted. In addition, the finger elements, in particular the free ends of the finger elements, of a hand element can be adjusted with respect to one another, for example raised and/or curved. In the described manner, the range of adjustment of the finger elements for example is increased in order for it to be possible to use the finger elements in a particularly effective and targeted manner. This can be increased even further, if necessary, in that the at least one hand element, to which a plurality of finger elements is secured, is secured to an arm element which for its part can be arranged in a vertically adjustable manner. The vertical adjustability can manifest itself for example in that the arm element can be moved up and down and or pivoted with respect to the chute base.

In order to temporarily store articles in the chute, a collecting region for articles can be provided at the lower end of the chute. The articles can then accumulate in the collecting region. The articles can, if necessary, be guided via the guiding device only when the collecting region has been at least partially filled and for example the articles reach back into the vicinity of the guiding device.

According to the method, the height of the free ends of at least individual finger elements can be set according to various criteria. Preferably, however, this takes place according to more or less exactly predetermined parameters. The adjustment of the finger elements can take place for example in a time-dependent manner. The more time passes, the more articles are temporarily stored at the end of the chute, at least as long as the articles are not removed in part or even entirely from the chute. Additionally or alternatively, the adjustment of the finger elements can also take place in a manner dependent on the number and/or type of individual stored articles, however. The number and type of articles, wherein in particular the size and shape of the articles can be meant, allows conclusions to be drawn as to the arrangement of the stored articles in the chute. Instead, or in addition, the position and/or dimensions of individual stored articles can be captured, specifically in particular the dimensions which are of particular interest for the guidance of further articles. For the sake of simplicity, the articles located downstream of the at least one guiding device as seen in the transporting direction can be taken as a basis for the adjustment of the finger elements. If necessary, however, the arrangement and/or the shape of a pile of articles can also be used as a criterion, which is determined via the adjustment of the finger elements. The latter allows particularly exact conclusions to be drawn as to how the articles yet to be stored should be guided by means of the at least one guiding device in order to influence the storage of the articles in the desired manner.

In order to be able to provide the parameters used as a basis for the adjustment of the finger elements of the at least one guiding device in a simple, cost-effective and reliable manner, it is appropriate to use at least one sensor which determines the at least one parameter. The use of at least one optical sensor is particularly expedient for capturing and evaluating the at least one parameter. The sensor can optionally capture the number and/or type of individual stored articles, the position of individual stored articles, the dimensions of individual stored articles, the arrangement of a pile of stored articles and/or the shape of a pile of stored articles. The method can be realized easily in terms of control technology when the at least one sensor outputs a signal which correlates with the at least one parameter to be determined and which can be passed on to a setting device for adjusting the height of the free ends of the finger elements in a manner dependent on the signal.

BRIEF DESCRIPTION OF THE SEVERAL VIEW OF THE DRAWINGS

Figure 2:
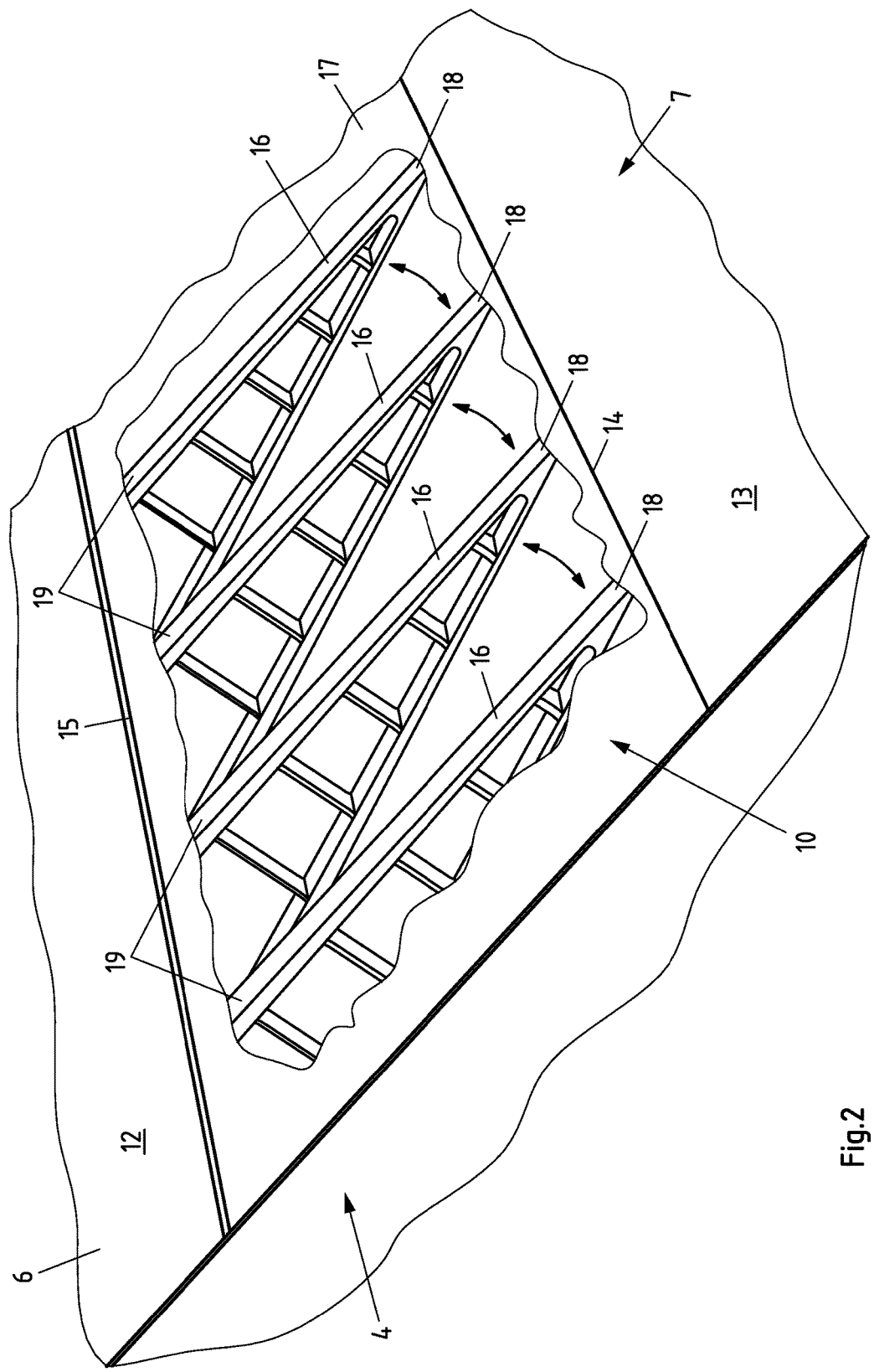
Figure 3:
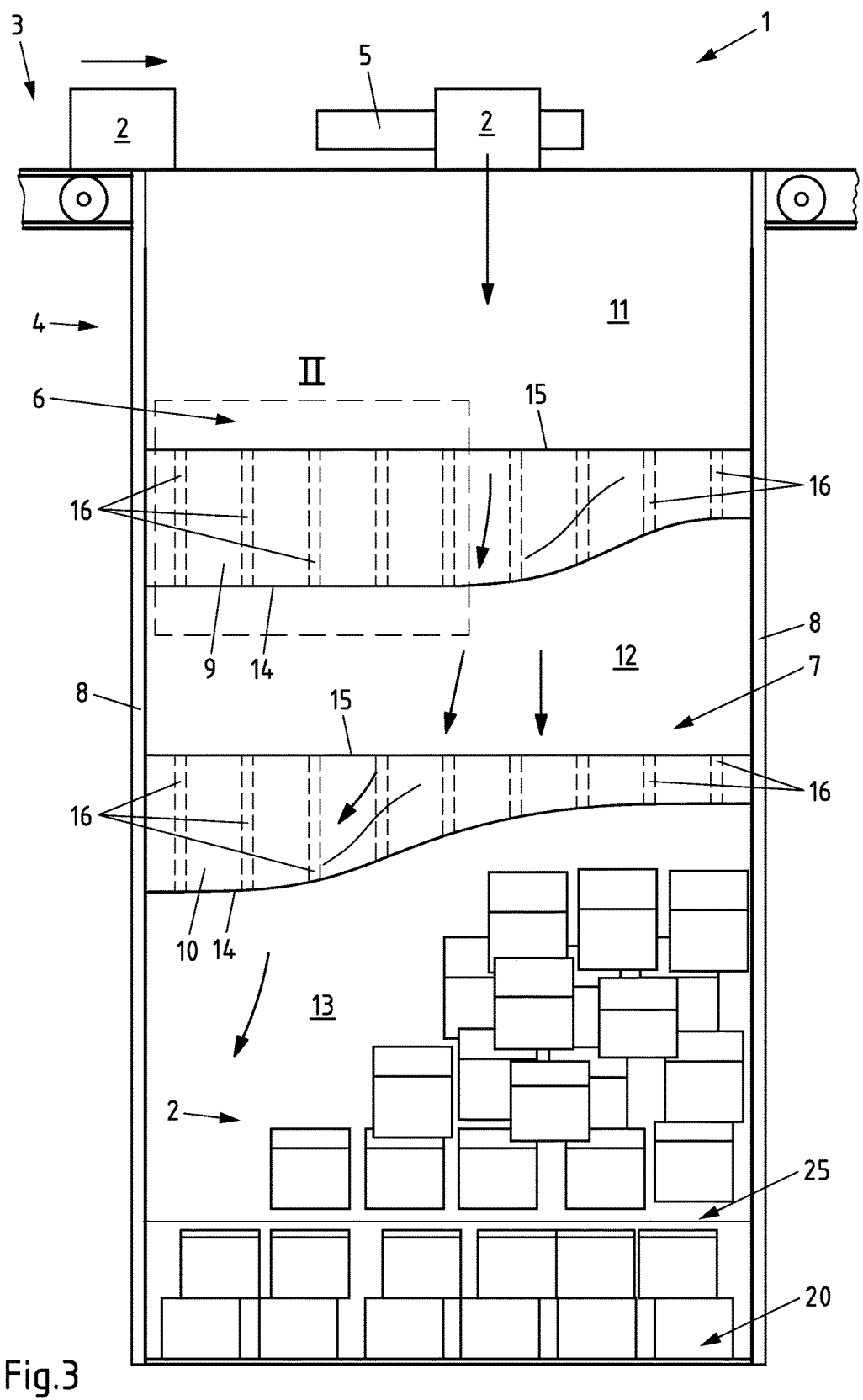
Figure 4:
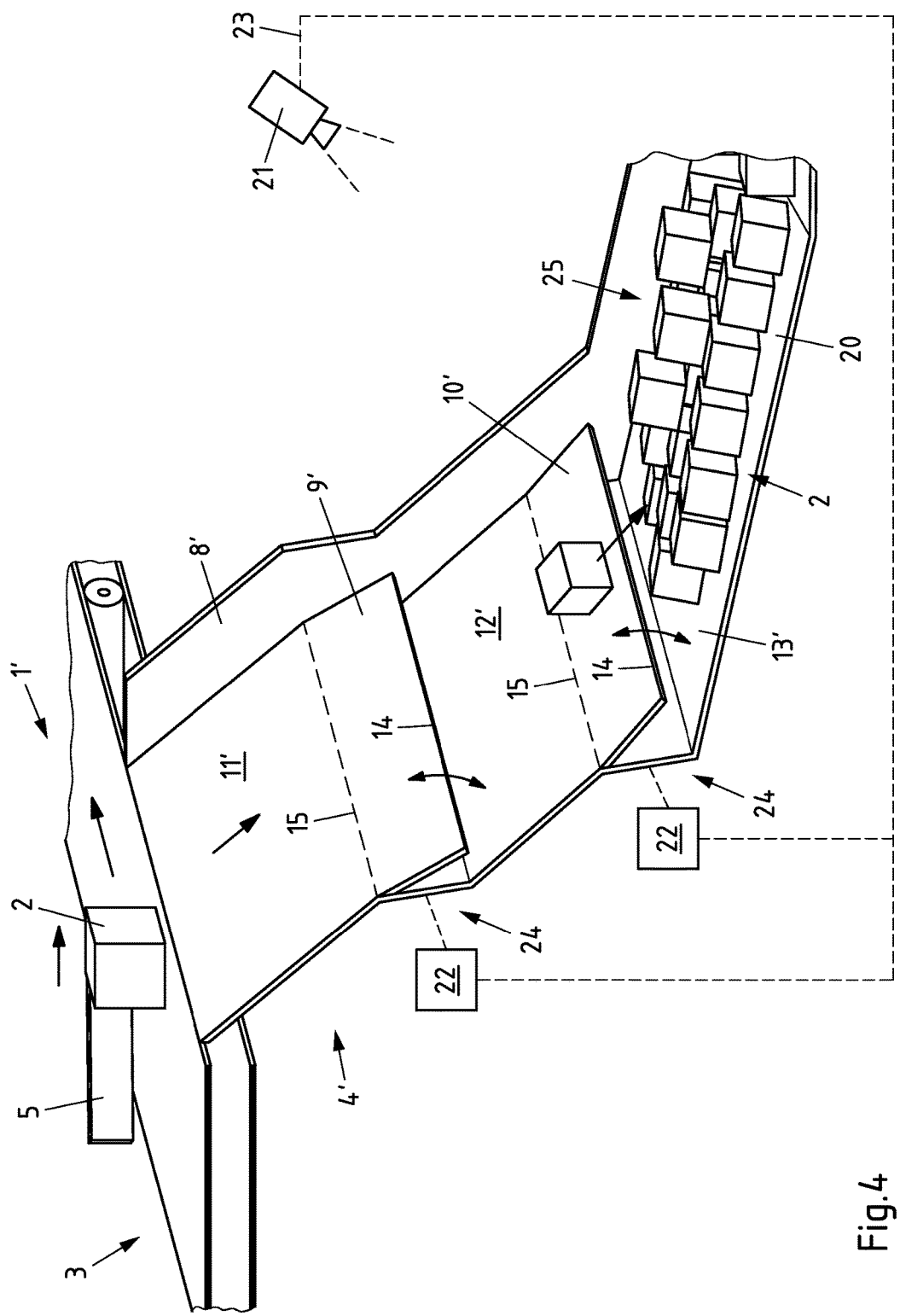
Figure 5:
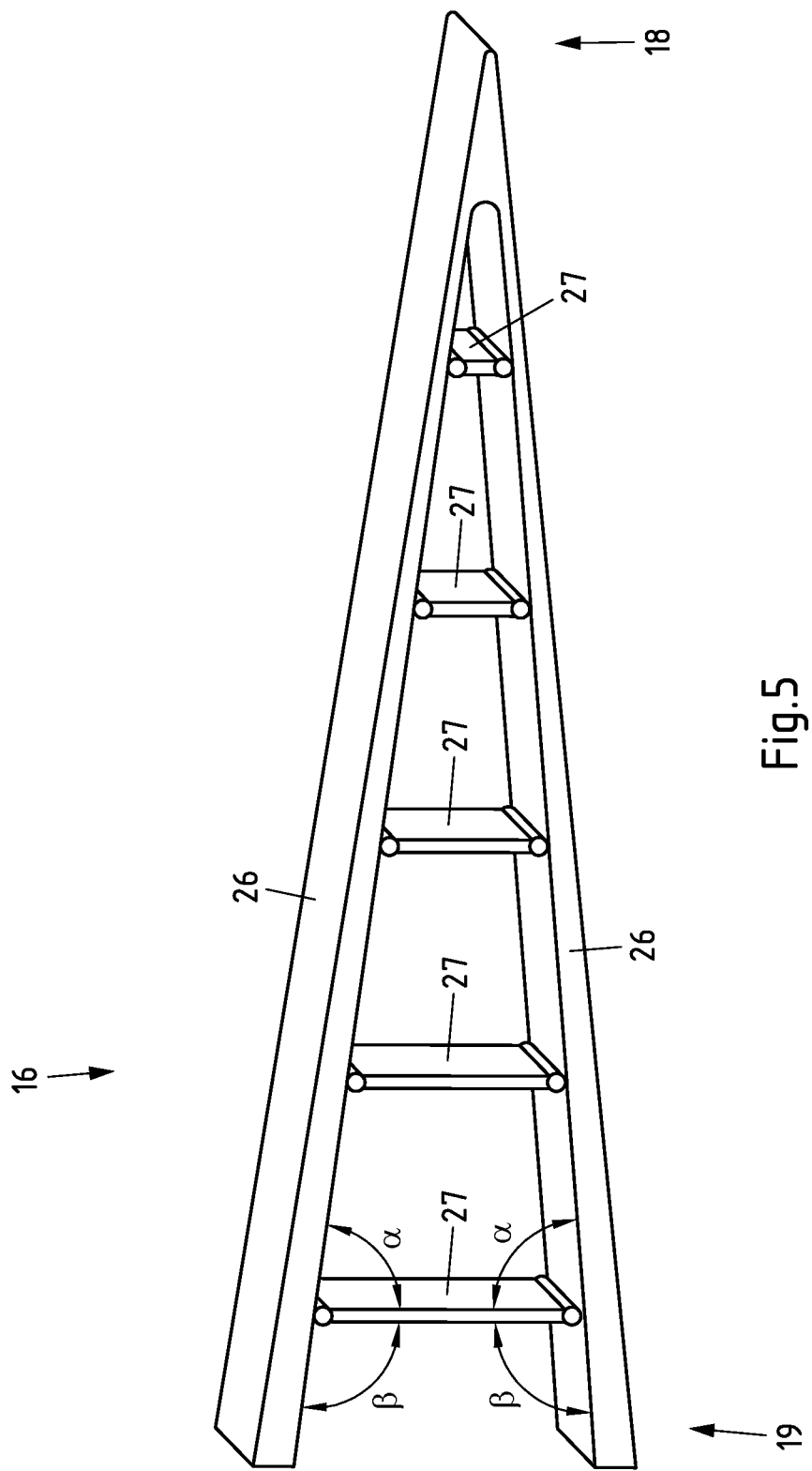
Figure 6A:
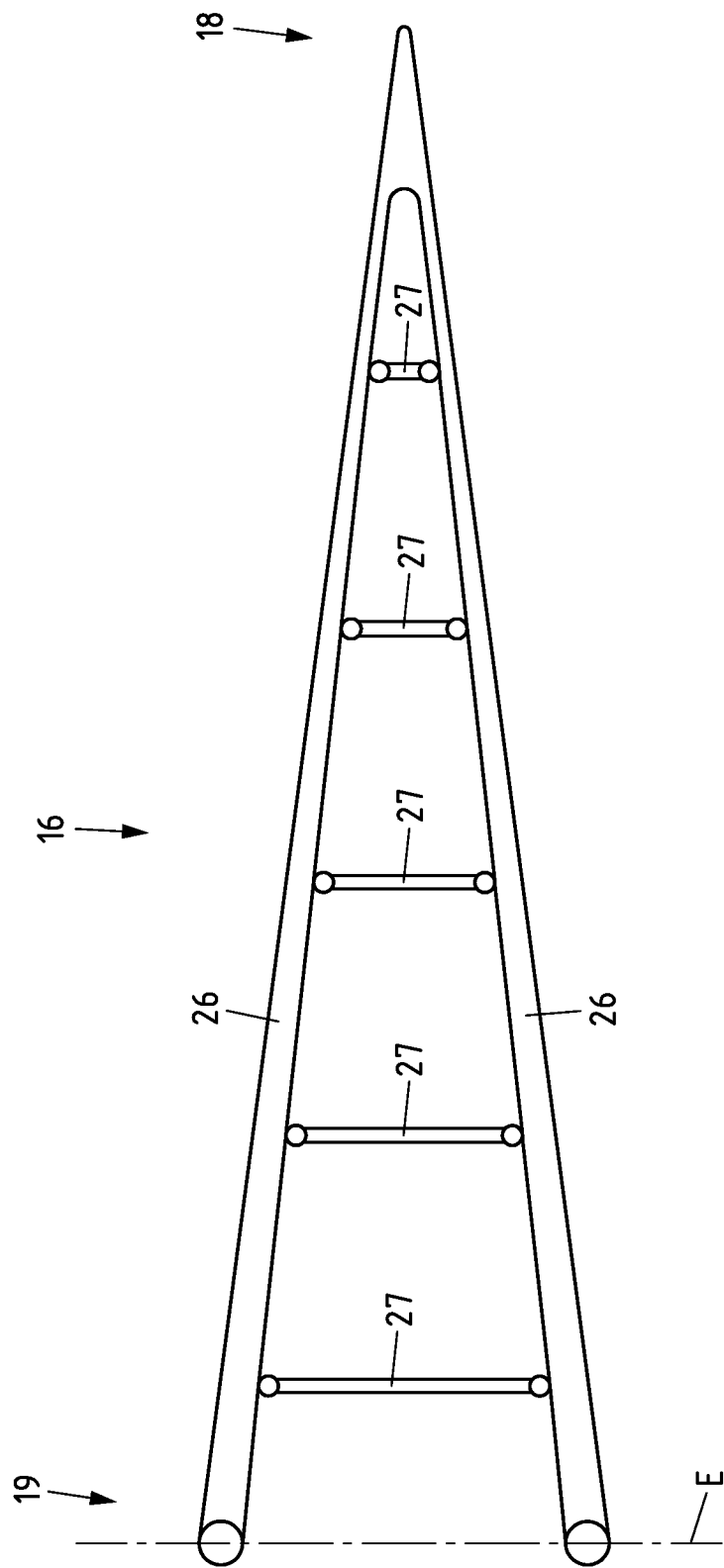
Figure 6B:
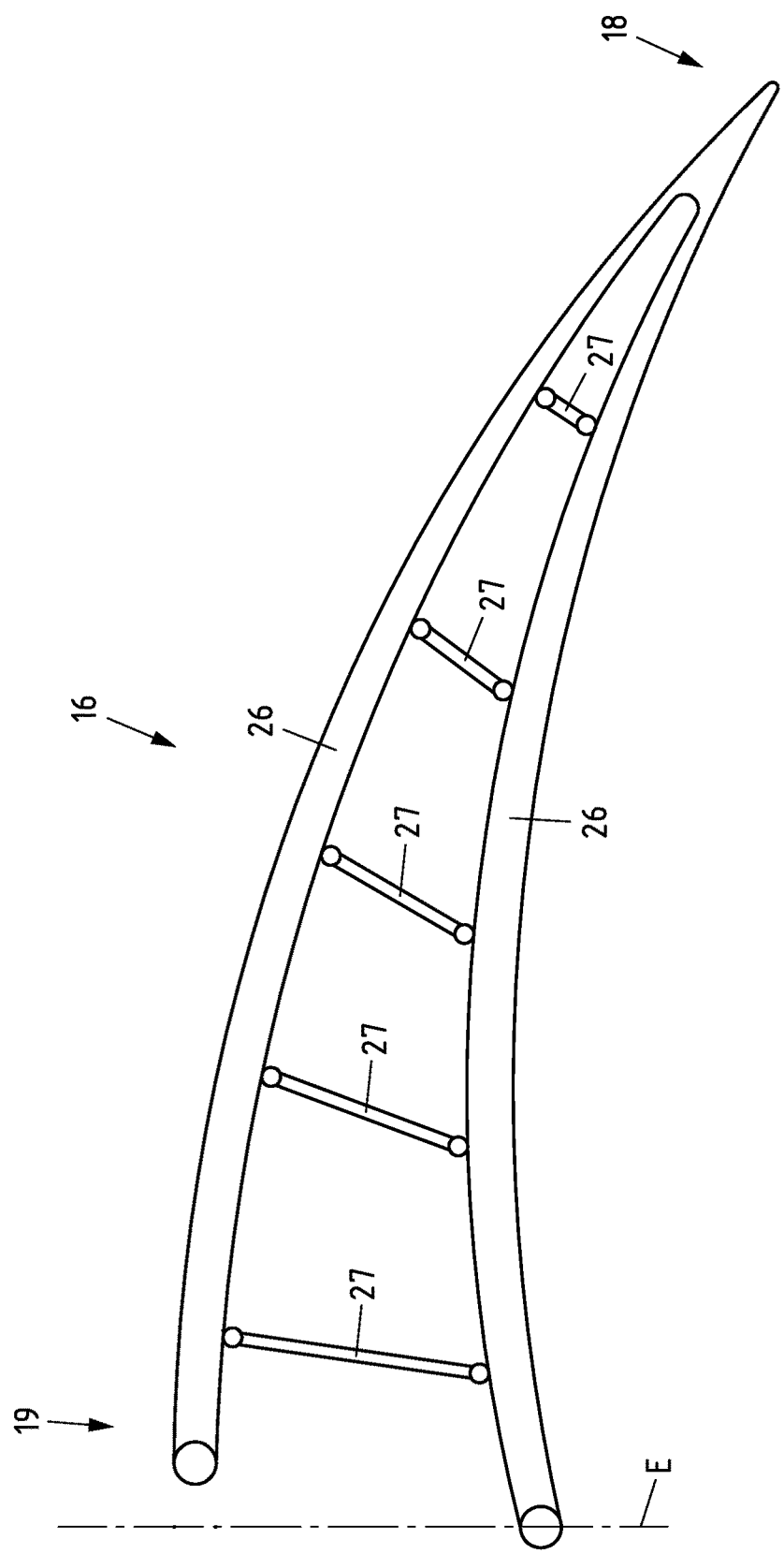
Figure 6C:
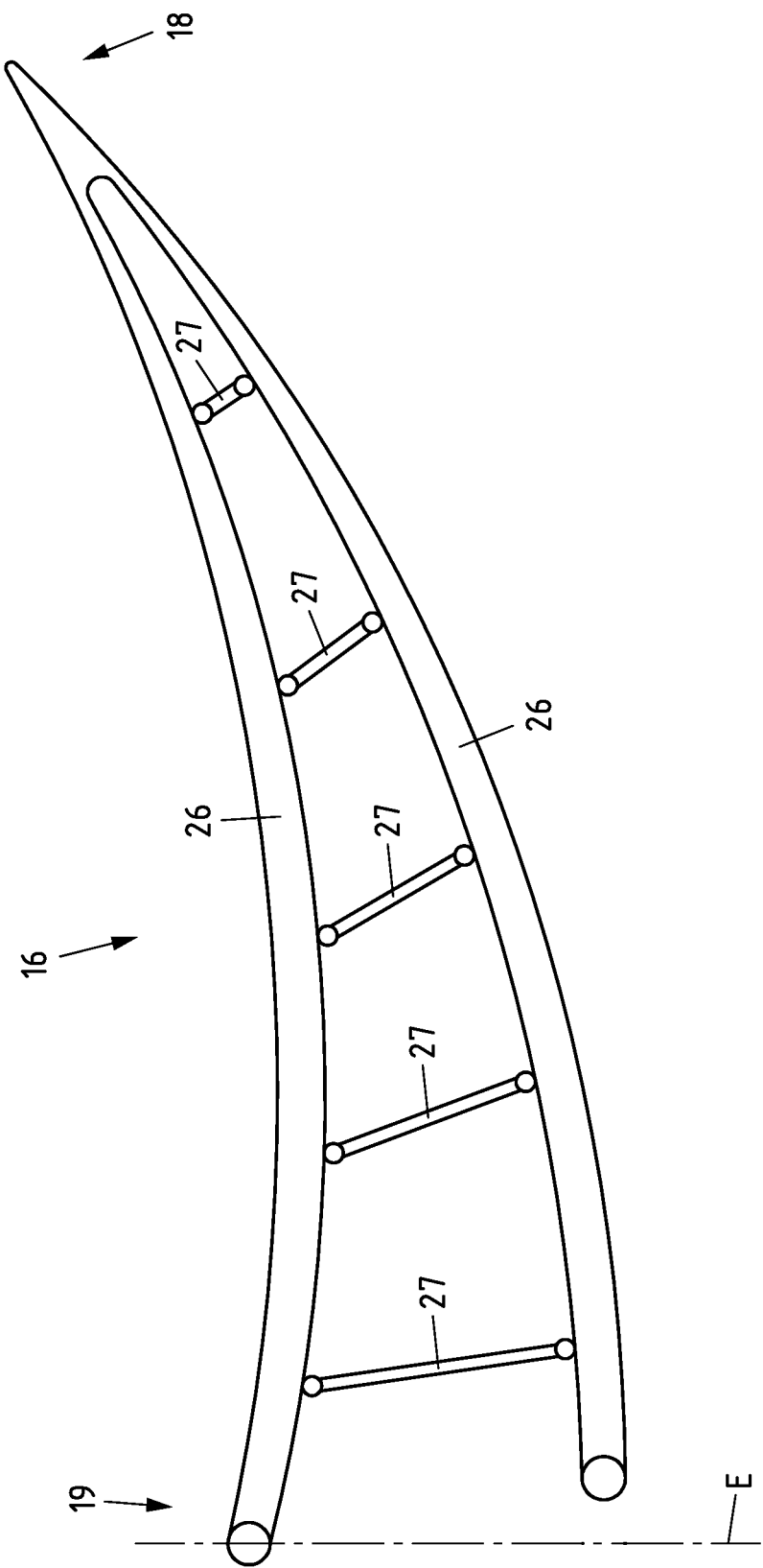
Figure 7:
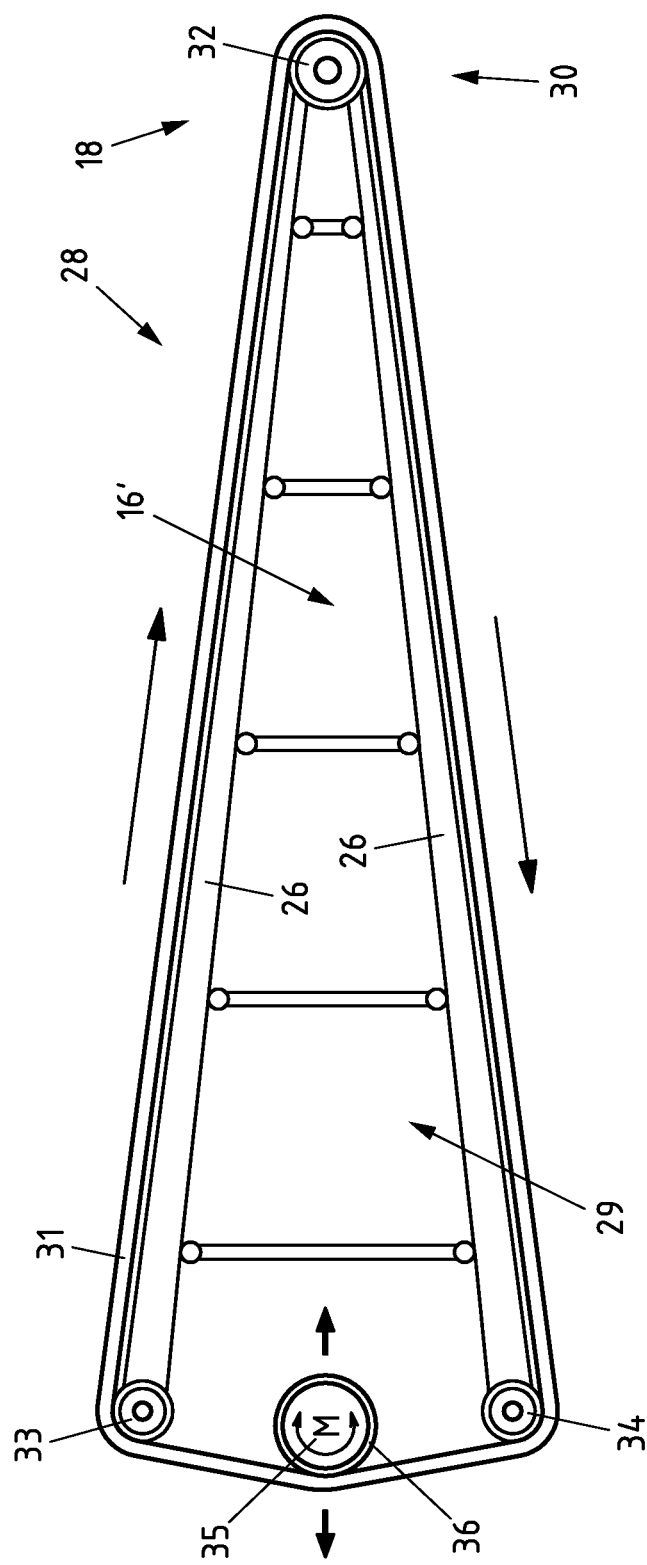

The invention is explained in more detail in the following text with reference to a drawing, which illustrates merely exemplary embodiments and in which FIG. 1 shows a perspective sectional view of a detail of a first sorting installation having a first chute according to the invention, FIG. 2 shows a perspective sectional view of a detail of a guiding device of the chute from FIG. 1, FIG. 3 shows a plan view of the detail of the sorting installation according to FIG. 1, FIG. 4 shows a perspective sectional view of a detail of a second sorting installation having a second chute according to the invention, FIG. 5 shows a perspective side view of a finger element of a guiding device of a chute according to the invention, FIGS. 6A-C show perspective side views of the vertical adjustment of the finger element from FIG. 5, and FIG. 7 shows a perspective side view of an alternative finger element of a guiding device of a chute according to the invention.

DETAILED DESCRIPTION OF THE INVENTION

FIG. 1 illustrates a detail of a sorting installation 1, known as a sorter, for sorting articles 2, in particular in the form of packages. In addition, the packages are in particular parcel consignments, that is to say primarily parcels and packets for sending to addressees. The sorting installation 1 is part of a distribution centre, to which parcels are delivered, sorted and, after being sorted, transported onwards in groups, in order ultimately for the articles 2 to be delivered to the addressee. Alternatively, it can also be a warehouse, in which articles 2 in the form of goods are sorted in order to be transported together to a different location. The sorting installation 1 can also be downstream of at least one production plant, however, in order to sort the produced products for a subsequent use thereof.

The article 2 to be sorted is transported up via a transporting device 3, which, in the case that is illustrated and to this extent preferred, is a belt conveyor. The transporting device 3 extends along a plurality of chutes 4, wherein each chute 4 is provided for particular articles 2 or classes of articles 2. A device that is not illustrated but is sufficiently well known determines which article 2 or which type of article 2 it is in each case, in order to decide which chute 4 the respective article 2 should be guided into. If the article 2 is at the level of the corresponding chute 4, the article 2 is guided into the chute 4 by a sorting installation 1. In the sorting installation 1 illustrated, pivotable flaps 5 are provided for feeding the article 2 to a chute 4, said flaps 5 being able to be pivoted via the transporting device 3 into an inclined position with respect to the transporting direction of the articles 2, and in the process pushing or guiding the articles 2 into the corresponding chutes 4.

The chutes 4 have an inclined chute base 6 which provides the chute surface 7 on which the articles 2 slide down along the chute 4. In the chute 4 that is illustrated and to this extent preferred, the chute base 6 is formed from a metal material. Furthermore, it is preferably what is known as a box chute, in which a side wall 8 is provided laterally with respect to the chute base 6 on each of the two sides of the chute base 6, said side wall 8 preventing articles 2 from accidentally dropping down laterally from the chute 4. In the chute 4 that is illustrated and to this extent preferred, two guiding devices 9, 10 are provided at different heights of the chute 4. The guiding devices 9, 10 extend transversely to the chute base 6 and transversely to the transporting direction of the articles 2 along the chute 4. The extent of the guiding device 9, 10 can also be considered horizontal. Without the guiding device 9, 10, the path that the articles 2 take along the chute base 6 would be defined by the articles 2 and the movement components with which the articles 2 pass onto the chute 4. The guiding devices 9, 10 can influence the transporting direction of the articles 2 along the chute 4, in that the guiding devices 9, 10 impart a particular movement component to the articles 2, which can, if necessary, differ from article 2 to article 2.

The guiding devices 9, 10 are provided between two chute-base sections 11, 12, 13. While the movement of the articles 2 along the chute-base sections 11, 12, 13 cannot be influenced, the articles 2 can be steered in a particular direction on passing over the guiding device 9, 10. This can be achieved by raising or lowering the guiding device 9, 10 or at least parts thereof.

In the chute 4 that is illustrated and to this extent preferred, the guiding device 9, 10 has a free lower end 14 which is formed in a vertically adjustable manner. The upper end 15 of the guiding device 9, 10 ends at least approximately at the height of the chute-base section 11, 12 arranged thereabove, such that the articles 2 can pass without problems from a chute-base section 11, 12 onto a guiding device 9, 10 adjoining the chute-base section 11, 12. In the chute 4 that is illustrated and to this extent preferred, the free lower end 14 of the guiding device 9, 10 can be arranged at least approximately at the height of the adjoining chute-base section 12, 13. Then, the articles can pass continuously or uniformly, in particular without jumping, from the guiding device 9, 10 onto the successive chute-base section 12, 13. The guiding devices 9, 10 can then, if necessary, slow down the articles 2, which can result in the articles 2 sliding in a different direction on the adjoining chute-base section 12, 13 on account of the guiding device 9, 10. Thus, slowing down of the articles 2 can already result in the articles 2 being guided.

However, a movement component is imparted to the articles 2 in particular by a deliberate vertical adjustment of the guiding device 9, 10. In a simple case, the guiding device 9, 10 can be raised or lowered as a whole. However, as illustrated in the detail of the guiding device according to FIG. 2, the guiding device 9, 10 has a series of finger elements 16 which are arranged in a manner distributed, in particular uniformly, along the extent of the guiding device 9, 10 transversely to the chute base 6 and so as to be vertically adjustable independently of one another. The finger elements 16 are arranged under a flexible material web 17 which rests at least partly on the finger elements 16 or is carried at least partly by the finger elements 16. Furthermore, the material web 17 is flexible enough for it to be able to adapt to the position of the finger elements 16 transversely to the chute 4. Thus, the finger elements 16 can predetermine the contour of the guiding device 9, 10 transversely to the chute 4, the material web 17 at least substantially following said contour. When the curvature of the finger elements 16 changes when the free ends 18 of the finger elements 16 are vertically adjusted, this preferably also has effects on the arrangement of the material web 17, which preferably also at least substantially follows the curvature of the finger elements 16 along the longitudinal extent thereof. In addition, the free ends 18 of the finger elements 16 are assigned to the lower end 14 of the material web 17 and the guiding device 9, 10. Otherwise, material webs 17 made of plastic, in particular plastic films, which are preferably comparatively abrasion resistant, are appropriate.

It is thus not necessary for all the finger elements 16 to be raised or lowered in the same way in corresponding guiding devices 9, 10. In the chute 4 that is illustrated and to this extent preferred, the finger elements 16 of the guiding devices 9, 10 are each provided so as to be vertically adjustable at least substantially independently of the other finger elements 16. The vertical adjustment relates in this case in particular to the free ends 18 of the finger elements 16, assigned to the lower end 14 of the guiding device 9, 10, that is to say the rear end as seen in the transporting direction of the articles 2. The upper end 19 of the finger elements 16, that is to say the front end as seen in the transporting direction of the articles 2, is arranged in a fixed position in the chute 4 that is illustrated and to this extent preferred. Thus, the finger elements 16 can, if necessary, be pivoted in a vertical direction about this fixed-position end 19. Alternatively or additionally, the finger elements 16 can also be curved in a vertical direction, as will be explained below. However, it is not absolutely necessary to curve the finger elements 16 in order to adjust the height of the free ends of the finger elements 16. If necessary, the finger elements 16 can also be configured to be pivoted with respect to a horizontal pivot axis. The curving of the finger elements 16 has in principle a preferred effect on the guiding of the articles 2, however.

In principle, it is preferred if, by means of the guiding devices 9, 10, it is possible to react to the actual arrangement of the articles 2 already temporarily stored for instance in a collecting region 20 at the end of the chute 4. Therefore, the chute 4 has a sensor 21, which, in the present case, is an optical sensor 21. The sensor 21 captures the position of the articles 2 in particular at the lower end of the chute 4, for instance in the collecting region 20. In this case, it is possible, if necessary, to dispense with capturing all of the articles 2 individually. It may suffice to capture a plurality of articles 2 together, in order in this way to obtain information about the position or arrangement thereof in the chute 4. It is therefore then possible to steer subsequent articles 2 with the aid of at least one guiding device 9, 10 to the place in the chute 4 where there is still room for further articles 2. For this purpose, the sensor 21 is connected to at least one setting device 22. The sensor 21 passes a signal 23 on to the at least one setting device 22. In addition, at least one drive device 24 for adjusting at least one finger element 16 or one of a group of finger elements 16 or of the finger elements 16 of a guiding device 9, 10 is provided. The at least one finger element 16 is adjusted by the at least one drive device 24 in a manner actuated by the at least one setting device 22 in dependence on the signal 23 from the at least one sensor 21. In this way, the path of subsequent articles 2 along the chute 4 can be influenced in a desired and predetermined manner.

FIG. 3 illustrates a plan view of the detail of the sorting installation 1 in FIG. 1. The finger elements 16 of the upper guiding device 9 are arranged at different heights. While the left-hand finger elements 16 are arranged in a lower position, the right-hand finger element 16 is arranged in an upper position. The other finger elements 16 are provided in different positions between the upper and the lower position, wherein the finger elements 16 are arranged higher, the further to the right the finger elements 16 are arranged. In this region, the guiding device 9 is consequently inclined towards the left-hand side. The lower free end 14 of the guiding device 9 is additionally arranged in an undulating manner. The next article 2 which is pushed into the chute 4 passes onto the guiding device 9 in this region and, as a result of the oblique orientation of the guiding device 9 in this region, slides thereon not only downwards but also to the side with respect to the chute 4. In this case, the article 2 generally slides more to the side, the more the corresponding region of the guiding device 9 is inclined towards the corresponding side of the chute 4. The path that the article 2 takes along the chute 4 is indicated by the solid-line arrows.

The article 2 guided somewhat to the side by the upper guiding device 9 passes onto the lower guiding device 10 after passing over the next chute-base section 12. In this guiding device 10, the two left-hand finger elements 16 are arranged in the lower position, while the three right-hand finger elements 16 are arranged in the upper position. The finger elements 16 provided in between are arranged between the lower position and the upper position, wherein, of two adjacent finger elements 16, the right-hand finger element 16 is always arranged higher than the left-hand finger element 16. The guiding device 10 is formed in an undulating manner transversely to the chute 4, with a region inclined towards the left-hand side that is arranged further to the left than that region of the upper guiding device 9 that is inclined towards the left-hand side. Thus, the article 2, to which a movement component towards the left has been imparted by the upper guiding device 9 and which thus passes over the lower guiding device 10 in the region inclined towards the left, is guided even further towards the left, in order to come to rest on the left-hand side of the chute 4, in particular of the collecting region 20. This is because there is still sufficient space there to receive further articles 2.

However, it is not only possible for the articles 2 to be guided to the side. The articles 2 can, alternatively or additionally, be guided in a vertical direction, specifically in particular upwards onto already stored articles 2, in order in this way to form a stack 25 of articles 2 which takes up less space than articles 2 arranged only alongside one another. This is likewise illustrated merely by way of example in FIG. 3 by way of a further article 2, which is steered less far to the left—for whatever reasons—by the first guiding device 9 than the article 2 that follows the solid arrows. This article 2 follows the dashed arrow and therefore passes over the lower guiding device 10 at a point at which the finger elements 16 of the lower guiding device 10 are arranged at least substantially in the upper position. As a result, the article 2 is steered onto articles 2 that are already stored and are arranged upstream of the corresponding section of the lower guiding device 10. Consequently, the articles 2 form a space-saving stack 25 of articles 2.

FIG. 4 illustrates a sorting installation 1' which is similar to the sorting installation in FIG. 1, for which reasons the same reference signs are used for identical components. An essential difference between the sorting installations 1, 1' relates to the chute 4 4', specifically in particular the chute base 6, 6'. The chute 4' is likewise configured as a box chute having lateral side walls 8', but the chute-base sections 11', 12', 13' each have a constant inclination. The chute-base sections 11', 12', 13' are thus planar and can have the same inclination or different inclinations to the horizontal. In the case of the chute 4 according to FIG. 1, by contrast, the inclination of each chute-base section 11, 12, 13 changes gradually and uniformly from the upper end to the lower end of the chute-base section 11, 12, 13.

Furthermore, the three chute-base sections 11', 12', 13' are not arranged in a manner aligned with one another, as is at least approximately the case in the chute according to FIG. 1. There is a much greater height offset between the adjoining chute-base sections 11', 12', 13', with the result that there is a jump for the articles 2 to be sorted in each case between the respectively adjoining chute-base sections 11', 12', 13'. The guiding devices 9', 10' provided between the chute-base sections 11', 12', 13' can, depending on their position, reduce the jump for the articles 2, or not. In the case of the chute 4 according to FIG. 1, a continuous or at least substantially uniform course of the inclination from one chute-base section 11, 12, via a guiding device 9, 10, to the next chute-base section 12, 13 can be achieved, in particular when the finger elements 16 of the guiding device 9, 10 are arranged in the lower position, which can also be supported by a curvature of the finger elements 16. This is not possible in the case of the chute 4' according to FIG. 4. A discontinuity remains at least at the transition from a chute-base section 11', 12' onto the following guiding device 9', 10' or at the transition from a guiding device 9', 10' onto the following chute-base section 12', 13'. This means that the inclinations of the chute-base section 11', 12', 13' and the guiding device 9', 10' do not transition into one another but change abruptly, or at least a considerable height offset is provided between the free lower end 14 of a guiding device 9', 10' and the subsequent chute-base section 11', 12', 13', representing a jump for the article 2 to be stored. A corresponding jump and/or a corresponding discontinuity of the inclinations could, if necessary, also be provided in a chute having chute-base sections, the inclination of which changes from the start of the chute-base section to the end of the chute-base section or which provides a curved chute surface. The corresponding principles, explained above, are accordingly transferable and combinable.

In this connection, consideration should, of course, be given to the fact that the guiding devices 9', 10' illustrated in FIG. 4 are arranged at a constant height transversely to the chute 4' only for the sake of simplicity. Since the guiding devices 9', 10' also have a series of finger elements 16' that are vertically adjustable with respect to one another, the guiding devices 9', 10' could also have different inclinations at different points transversely to the chute 4'. In this case, if necessary, the above-described principles and the likewise above-described finger elements can be used. Alternatively, however, finger elements could also be used, the curvature of which does not change upon vertical adjustment, but are to this extent formed in a rigid manner. The finger elements can then be pivoted up and down about a preferably horizontal axis. Since corresponding finger elements can be provided by a person skilled in the art, no further description of corresponding finger elements is required here.

In FIG. 4, the upper guiding device 9' is arranged in a lower or close to the lower position, in order to reduce the jump for the articles 2 and thus to prevent or at least reduce damage. The lower guiding device 10' is in an upper position or is raised considerably compared with the position of the upper guiding device 9'. This has the result that further articles 2 passing over the lower guiding device 10' are guided onto articles 2 already stored in the chute 4' and form a stack 25 there. In this case, it is the case both for the chute 4' according to FIG. 4 and the chute 4 according to FIG. 1 that, if necessary, it is possible to dispense with the upper or lower guiding device 9, 9', 10, 10'. The more guiding devices are provided, the higher the outlay on equipment and control technology. However, the articles 2 can be guided more precisely, more flexibly and more comprehensively along the chute 4, 4' in the case of a plurality of guiding devices.

FIG. 5 illustrates a finger element 16 of a guiding device 9, 10 of a chute 4. The finger element 16 comprises two flank elements 26 which, in the finger element 16 that is illustrated and to this extent preferred, extend jointly from an end 19, illustrated on the left and connected to the chute 4, of the finger element 16 to the opposite free end 18, illustrated on the right, of the finger element 16. In this case, the flank elements 26 approach one another continuously in the direction of the free end 18, until, in the finger element 16 that is illustrated and to this extent preferred, the flank elements 26 transition into one another at the free end 18 of the finger element 16. Therefore, a conically tapering finger element 16 that narrows in one direction is obtained. Crosspieces 27 are provided between the flank elements 26 in a manner distributed along the length of the finger element 16, the flank elements 26 being connected together via said crosspieces 27. In the finger element 16 that is illustrated and to this extent preferred, the crosspieces 27 are each connected in a pivotable manner, in particular in an articulated manner, at their opposite ends to the flank elements 26. Alternatively, the crosspieces 27 could be configured in a flexible manner, in order to allow the crosspieces 27 to move with respect to the flank elements 26. In the finger element 16 that is illustrated and to this extent preferred, the crosspieces 27 are distributed at regular spacings along the length of the finger element 16. This is not absolutely necessary, however. It is also preferred, merely for the sake of simplicity, for the crosspieces 27 to extend parallel to one another. However, it is particularly expedient for the crosspieces 27 to form an acute angle α with each of the flank elements 26 on one side and an obtuse angle β on the opposite side.

The flank elements 26 that are illustrated and to this extent preferred are configured in a flexible manner, such that the flank elements 26 can be bent, wherein the finger element 16 is curved to a greater or lesser extent, this being illustrated in particular in FIGS. 6A-C. As a result of the finger elements 16 of a guiding device being curved, the free ends of the finger elements are moved in particular upwards or downwards. This ultimately results in a vertical adjustment of the finger elements as a whole, even if they can be fixedly connected at one end to the chute or the guiding device. To this end, the flank elements can be formed for example from a metal or a plastics material. The same goes for the crosspieces, which do not have to be configured in a flexible manner, however.

In FIG. 6A, the finger element 16 from FIG. 5 is illustrated in a stretched orientation, in which the ends of the flank elements 26 are arranged in a plane E. In the finger element 16 that is illustrated and to this extent preferred, the flank elements 26 are formed at least substantially symmetrically to one another in this position. If, according to FIG. 6B, the upper flank element 26 is moved in the direction of the free end of the finger element 16 with respect to the plane E, the finger element 16 is curved downwards. In other words, the finger element 16 is adjusted downwards, wherein a finger element 16 can be adjusted downwards or upwards, preferably as a whole, if necessary without being curved. The curving of the finger element 16 that is illustrated and to this extent preferred results from the flexibility of the flank elements 26 and of the pivotable connections between the flank elements 26 and the crosspieces 27 provided therebetween. In this case, it should be noted that the flank elements 26 do not absolutely have to be configured in a flexible manner along their entire longitudinal extent, even if this is often preferred. It is also conceivable for the flank elements to have rigid portions which are connected together in a pivotable, in particular articulated, manner, preferably by way of a hinge. In this case, corresponding flank elements should have at least one pivoting connection between two crosspieces.

According to FIG. 6C, the finger element 16 is curved upwards in an analogous manner when the lower flank element 26 is moved forwards in the direction of the free end 18 of the finger element 16 with respect to the plane E. In this way, adjustment of the free end of the finger element 16 and adjustment of the finger element 16 in each case downwards can thus be achieved.

It can furthermore be gathered from FIGS. 6A-C that the crosspieces 27 between the flank elements are inclined in opposite directions during the curving of the finger element 16, when the finger element 16 is adjusted upwards and downwards. In order to adjust the flank elements 26 in an analogous manner to FIGS. 6A-C, a drive unit 24 (not illustrated) can be provided. In this case, suitable drive units 24, for instance linear drives, are known from the prior art. It is also not illustrated that more than two, for example at least three or four, flank elements can be provided, for instance in order not only to adjust the finger element for example up and down, but also to the side. For the sake of simplicity, these are then arranged in a manner distributed, in particular regularly, about a longitudinal axis of the finger element. The plurality of flank elements can then taper, in particular with free ends, at a common tip of the finger element. In addition or alternatively, the crosspieces can preferably each connect all the flank elements together. The flank elements that are illustrated and to this extent preferred are configured in a strip-shaped manner. However, a plate-shaped or bar-shaped configuration of the flank elements would also be possible, as long as the flank elements allow the flank elements to move and curve with respect to one another.

FIG. 7 illustrates a finger element 16' as part or in the form of a belt conveyor 28, wherein the finger element 16' forms the load-bearing structure 29 of the belt conveyor 28 in the exemplary embodiment that is illustrated and to this extent preferred. The finger element 16' is in this case configured generally in an analogous manner to the finger element 16 illustrated in FIG. 1. Therefore, the belt conveyor 28, in particular the free end 30 of the belt conveyor 28, can be adjusted upwards and downwards. The belt 31 that circulates around the finger element 16' along the flank elements 26 in this case follows the adjustment, in particular the curving, of the finger element 16' upwards and downwards. In this case, the belt 31 circulates endlessly around the load-bearing structure 29 and thus around the finger element 16'. To this end, the finger element 16' that is illustrated and to this extent preferred has a plurality of deflections in the form of deflection rollers 32, 33, 34. One deflection roller 32 is arranged at the free end 18 of the finger element 16' and in each case one further deflection roller 33, 34 is arranged at the opposite ends of the flank elements 26. The deflection rollers 32, 33, 34 are in this case carried by the load-bearing structure 29 of the finger element 16'. In order that the belt 31 is guided close to the upper flank element 26 or to the two flank elements 26, as required, even in the case of a curved finger element 16', the belt 31 can be held at at least one point on at least the upper flank element 26 via suitable connecting means.

The belt 31 of the finger element 16' can be driven by the weight force acting on an article 2 located on the finger element 16', in order to improve the transport of the article 2 along the finger element 16'. However, a motorized drive of the belt 31 can also be provided, in order to forcibly drive the belt 31. In this case, the belt 31 preferably moves on the top side of the finger element 16' in the direction of the free end 18 of the finger element 16'. In order to slow down an article 2, the drive and the belt 31 can be configured to drive the belt 31 more slowly than the original speed of the article 2 or even in the opposite direction. The drive 35 acts on the belt 31 via a drive roller 36, which can be adjusted for example in the longitudinal direction of the finger element 16', if necessary, in order to tension the belt 31. In addition, in order for the belt 31 to be driven in as slip-free a manner as possible, corresponding toothings, which mesh with one another, can be provided on the belt 31 and on the drive roller 36. In contrast to the illustration in FIG. 7, the load-bearing structure of the finger element can have further components, if necessary.

The belt 31 of the belt conveyor 28, whether it is driven by a motor or not, can, if necessary, circulate only around one finger element 16', wherein, if necessary, each finger element 16' can then have a separate belt 31. Thus, the articles 2 can be steered very flexibly and in different manners at different points of the guiding device 9, 10. However, the outlay on equipment and control technology is then generally higher. By contrast, it is simpler in terms of equipment and control technology for at least one belt to extend transversely to the chute 4 over a plurality of finger elements 16' arranged alongside one another and also to circulate around this plurality of finger elements 16'. If necessary, it is also possible for a single belt 31 to circulate around all the finger elements 16' of a guiding device 9, 10 and in the process to cover the gaps between the finger elements 16'.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A chute for articles, having a chute base for the article to slide down and comprising at least two chute-base sections, wherein the at least two chute-base sections form a height offset between one another, wherein at least one guiding device is provided between the at least two chute-base sections in order to guide the article from one chute-base section to the next chute-base section, and wherein the at least one guiding device has a vertically adjustable free end that points in the direction of the next chute-base section,
   wherein the guiding device has, transversely to the chute base, a first plurality of finger elements that are arranged alongside one another and are at least in part vertically adjustable independently of one another.

2. The chute according to claim 1, wherein the finger elements have free ends that are arranged at different heights.

3. The chute according to claim 2, wherein the free ends of the finger elements are arranged in an undulating manner transversely to the chute base.

4. The chute according to claim 1, wherein the finger elements have free ends that are at least substantially continuously adjustable between a lower position and an upper position.

5. The chute according to claim 1, wherein the finger elements have free ends that are arranged, in a lower position, at least approximately at the height of the next chute-base section, and/or, in an upper position, at a particular vertical spacing from the next chute-base section.

6. The chute according to claim 5, wherein, in the lower position, the free ends of the finger elements provide a smooth transition of the inclination of the chute base from one chute-base section to the next chute-base section.

7. The chute according to claim 1, wherein the finger elements each have a free end and at least two flexible flank elements that extend jointly in the longitudinal direction of the finger element as far as the free end of the finger element, and in that the flexible flank elements are each connected flexibly together in the longitudinal direction of the finger elements via a plurality of crosspieces, such that the free ends of the finger elements can be adjusted from a lower position into an upper position and back again.

8. The chute according to claim 7, wherein the crosspieces and the associated flexible flank elements each have an acute angle $\alpha$, and an obtuse angle $\beta$.

9. The chute according to claim 8, wherein the acute angle $\alpha$ is between 10° and 80° and wherein the obtuse angle $\beta$ is between 100° and 170°.

10. The chute according to claim 7, wherein the flexible flank elements of the finger elements are each adjustable with respect to one another in the longitudinal direction of the finger elements such that the finger elements are curved to a greater or lesser extent with respect to one another by adjustment of the flexible flank elements.

11. The chute according to claim 10, wherein the flexible flank elements of the finger elements are each adjustable with respect to one another in the longitudinal direction of the finger elements via a drive device.

12. The chute according to claim 1, wherein the finger elements carry a flexible material web that bridges the intermediate spaces between the finger elements, and/or in that the finger elements have at least one material web that circulates around in each case at least one finger element and is driven in the longitudinal direction of the finger elements.

13. The chute according to claim 1, wherein at least one sensor for capturing the number and/or type of individual stored articles, the position of individual stored articles, dimensions of individual stored articles, the arrangement of a pile of stored articles and/or the shape of a pile of stored articles is provided.

14. The chute according to claim 13, wherein the sensor is an optical sensor.

15. The chute according to claim 1, wherein a setting device for adjusting the height of the free ends of the finger elements in a time-dependent manner, in a manner dependent on the number and/or type of individual stored articles and/or in a manner dependent on at least one parameter captured by the sensor is provided.

16. The chute according to claim 1, wherein at least one hand element is provided, in that the at least one hand element carries a second plurality of finger elements that are vertically adjustable with respect to one another.

17. The chute according to claim 16, wherein the at least one hand element is vertically adjustable.

18. The chute according to claim 16, wherein the at least one hand element is carried by an arm element.

19. The chute according to claim 16, wherein the arm element is vertically adjustable.

20. The chute according to claim 16, wherein the second plurality of finger elements comprises at least one finger element of the first plurality of finger elements.

21. The chute according to claim 1, wherein a collecting region for temporarily storing articles is provided at the lower end of the chute.

22. The chute according to claim 1, wherein the articles are packages and/or consignments.

23. The chute according to claim 1, wherein the free ends of the finger elements are arranged, transversely to the chute base, partially in a lower position, partially in an upper position and/or partially in a position between the lower position and the upper position.

24. A method for conveying articles along a chute according to claim 1, comprising the steps of:
   temporarily storing the articles at the lower end of the chute,
   adjusting the height of the free ends of at least individual finger elements while the articles are being temporarily stored, in order to make better use of the width of the chute for storing the articles, in order to stack on top of one another the articles to be stored, and/or in order to reduce the dropping height of the articles from one chute-base section to the next chute-base section.

25. The method according to claim 24, further comprising the step of:
   adjusting the height of the free ends of at least individual finger elements in a time-dependent manner, in a manner dependent on the number and/or type of individual stored articles, in a manner dependent on the position of individual stored articles, in a manner dependent on dimensions of individual stored articles, in a manner dependent on the arrangement of a pile of stored articles and/or in a manner dependent on the shape of a pile of stored articles.

26. The method according to claim 25, further comprising the step of:
   capturing the number and/or type of individual stored articles, the position of individual stored articles, the dimensions of individual stored articles, the arrangement of a pile of stored articles and/or the shape of a pile of stored articles by at least one sensor.

27. The method according to claim 26, wherein the sensor comprises an optical sensor.

28. The method according to claim 26, wherein the at least one sensor transmits a signal to a setting device in order to adjust the height of the free ends of the finger elements in a manner dependent on the signal.

* * * * *